US012790278B2

(12) United States Patent

Liu et al.

(10) Patent No.: US 12,790,278 B2

(45) Date of Patent: Nov. 10, 2026

(54) SYNTHETIC CASSITERITE USED AS A STANDARD SUBSTANCE FOR IN-SITU TIN ISOTOPE TESTING, PREPARATION METHODS THEREOF AND METHODS FOR IN-SITU TIN ISOTOPE ANALYSIS USING SYNTHETIC CASSITERITE

(71) Applicant: NORTHWEST UNIVERSITY, Xi'an (CN)

(72) Inventors: Peng Liu, Xi'an (CN); Zhian Bao, Xi'an (CN); Honglin Yuan, Xi'an (CN)

(73) Assignee: NORTHWEST UNIVERSITY, Xi'an (CN)

( * ) Notice: Subject to any disclaimer, the term of this patent is extended or adjusted under 35 U.S.C. 154(b) by 546 days.

(21) Appl. No.: 18/477,537

(22) Filed: Sep. 28, 2023

(65) Prior Publication Data

US 2024/0174573 A1 May 30, 2024

(30) Foreign Application Priority Data

Nov. 30, 2022 (CN) ......................... 202211520906.7
Jan. 31, 2023 (CN) ......................... 202310079080.3

(51) Int. Cl.

| | |
|---|---|
| ***G01N 30/72*** | (2006.01) |
| ***C04B 35/457*** | (2006.01) |
| ***C04B 35/626*** | (2006.01) |
| ***G01N 21/65*** | (2006.01) |

(52) U.S. Cl.

CPC ........ *C04B 35/457* (2013.01); *C04B 35/6261* (2013.01); *G01N 21/65* (2013.01); *G01N 30/72* (2013.01)

(58) Field of Classification Search

CPC .............. C04B 35/457; C04B 35/6261; C04B 2235/5463; G01N 21/65; C01P 2002/82; C01G 19/02

See application file for complete search history.

(56) References Cited

U.S. PATENT DOCUMENTS 8,999,025 B1 4/2015 Miess et al.

FOREIGN PATENT DOCUMENTS

| | | | | |
|---|---|---|---|---|
| CN | 107216868 B | * | 9/2019 | ............... C09K 8/80 |
| CN | 110498621 A | * | 11/2019 | ............. C04B 35/66 |
| CN | 114047246 A | * | 2/2022 | ........... G01N 27/626 |
| DE | 1592429 A1 | | 12/1970 | |
| KR | 20160078778 A | | 7/2016 | |

OTHER PUBLICATIONS

Li et al. Dating cassiterite using laser ablation ICP-MS. Ore Geology Reviews 72 (2016) 313-322.*

(Continued)

*Primary Examiner* — Noah S Wiese

(74) *Attorney, Agent, or Firm* — METIS IP LLC

(57) ABSTRACT

Synthetic cassiterite used as a standard substance for in-situ tin isotope testing, a preparation thereof, and a method for in-situ tin isotope analysis using the synthetic cassiterite are provided. The preparing method includes: grinding a natural cassiterite into ultrafine powder; and obtaining a synthetic cassiterite that can be used as a standard substance.

19 Claims, 8 Drawing Sheets

(56) References Cited

OTHER PUBLICATIONS

Clayton et al. Precise determination of the isotopic composition of Sn using MC-ICP-MS. J. Anal. At. Spectrom., 2002, 17, 1248-1256.*
Liu et al. Tin isotopes via fs-LA-MC-ICP-MS analysis record complex fluid evolution in single cassiterite crystals. American Mineralogist, vol. 106, pp. 1980-1986, 2021.*
Zhou et al. Revisiting the Happy Jack Uraninite Reference Material: A Combined Electron Beam and Laser Ablation In Situ Study. Geostandards and Geoanalytical Research. vol. 46, No. 4, pp. 735-749. 2022.*
First Office Action in Chinese Application No. 202310079080.3 mailed on Jan. 6, 2026, 21 pages.
Zhang, Duo et al., A high-temperature sintered cassiterite reference material for in situ determination of Sn isotope ratios, Journal of analytical atomic spectrometry, 38:204-211, 2023.
Liu, Yongsheng et al., The Application of LA-ICP-MS in Elemental Analysis of Geological Samples, Chinese Science Bulletin, 2013, 18 pages.
L. Paul Bedard et al., A new technique for the synthesis of geochemical reference samples for laser ablation-ICP-MS analysis of zircons, Chemical Geology, 138: 1-7, 1997.
Feng, Yantong et al., A New Synthesis Scheme of Pyrite and Chalcopyrite Reference Materials for in Situ Iron and Sulfur Isotope Analysis Using La-Mc-Icp-Ms, Journal of Analytical Atomic Spectrometry, 2022, 12 pages.
J. R. De Laeter et al., The Isotopic Composition of Terrestrial and Meteoritic Tin. Journal of Geophysical Research, 70(12): 2895-2903, 1965.
R. D. Loss et al., The Isotopic Composition of Zinc, Palladium, Silver, Cadmium,Tin, and Tellurium in Acid-Etched Residues of the Allende Meteorite, Geochimica et Cosmochimica Acta, 1990, 12 pages.
Wang, Xueying et al., Tin Isotope Fractionation during Magmatic Processes and the Isotope Composition of the Bulk Silicate Earth, Geochimica et Cosmochimica Acta, 2018, 47 pages.
Wang, Xueying et al., Tin Isotopes Indicative of Liquid-Vapour Equilibration and Separation in the Moon-Forming Disk, Nature Geoscience, 2019, 6 pages.
Wang, Xueying et al., The Sn isotope composition of chondrites: Implications for volatile element depletion in the Solar System, Geochimica et Cosmochimica Acta, 2021, 19 pages.
N. Badullovich et al., Tin Isotopic Fractionation During Igneous Differentiation and Earth'S Mantle Composition, Geochemical Perspectives Letters, 2017, 5 pages.
J.B. Creech et al., Tin and Zinc Stable Isotope Characterisation of Chondrites and Implications for Early Solar System Evolution, Chemical Geology, 2019, 10 pages.
Peter Černý et al., Granite-Related Ore Deposits, Economic Geology 100th Anniversary Volume, 2005, 34 pages.
Liu, Peng et al., Tin Isotopes via Fs-La-Mo-Icp-Ms Analysis Record Complex Fluid Evolution in Single Cassiterite Crystals, American Mineralogist, 2021, 7 pages.
Yao, Junming et al., Sn-Isotope Fractionation as a Record of Hydrothermal Redox Reactions, American Mineralogist, 2018, 8 pages.
J. R. De Laeter et al., Tin: Its Isotopic and Elemental Abundance, Geochimica et Cosmochimica Acta, 1967, 17 pages.
Robin Clayton et al., Precise Determination of the Isotopic Composition of Sn Using Mo-Icp-Ms, Journal of Analytical Atomic Spectrometry, 2002, 9 pages.
M. Haustein et al., Tin Isotopy—A New Method for Solving Old Questions, Archaeometry, 52(5): 816-832, 2010.
Frédéric Moynier et al., Mass-Independent Isotopic Fractionation of Tin in Chemical Exchange Reaction Using a Crown Ether, Analytica Chimica Acta, 2009, 6 pages.
Ryan Mathur et al., Preparation and Measurement of Cassiterite for Sn Isotope Analysis, Geostandards and Geoanalytical Research, 2017, 7 pages.
Wang, Xueying et al., A New Method of Sn Purification and Isotopic Determination With a Double-Spike Technique for Geological and Cosmochemical Samples, Journal of Analytical Atomic Spectrometry, 2017, 11 pages.
Zhang, Le et al., The Influence of the Double Spike Proportion Effect on Stable Isotope (Zn, Mo, Cd, and Sn) Measurements by Multicollector-Inductively Coupled Plasma-Mass Spectrometry (MC-ICP-MS), ournal of Analytical Atomic Spectrometry, 2018, 23 pages.
Erika Yamazaki et al., Tin isotope analysis of cassiterites from Southeastern and Eastern Asia, Geochemical Journal, 2013, 15 pages.
Gerhard Brugmann et al., Determination of the Tin Stable Isotopic Composition in TinBearing Metals and Minerals by MC-ICP-MS, Geostandards and Geoanalytical Research, 2017, 21 pages.
Marie Schulze et al., Determination of Tin Isotope Ratios in Cassiterite by Femtosecond Laser Ablation Multicollector Inductively Coupled Plasma Mass Spectrometry, Spectrochimica Acta Part B, 2017, 9 pages.
She, Jia-Xin et al., Sn Isotope Fractionation During Volatilization of Sn(IV) Chloride: Laboratory Experiments and Quantum Mechanical Calculations, Geochimica et Cosmochimica Acta, 2019, 55 pages.
Cheng, Jigui et al., Microstructure and properties of W-2wt% TiN composite materials prepared by spark plasma sintering, Proceedings of the 15th East China Five Provinces and One City Powder Metallurgy Technology Exchange Conference, 2014, 6 pages.

* cited by examiner

SYNTHETIC CASSITERITE USED AS A STANDARD SUBSTANCE FOR IN-SITU TIN ISOTOPE TESTING, PREPARATION METHODS THEREOF AND METHODS FOR IN-SITU TIN ISOTOPE ANALYSIS USING SYNTHETIC CASSITERITE

CROSS-REFERENCE TO RELATED APPLICATIONS

This application claims priority to Chinese Patent Application No. 202310079080.3, filed Jan. 31, 2023, which claims priority to Chinese Patent Application No. 202211520906.7, filed on Nov. 30, 2022, the contents of which are hereby incorporated by reference to its entirety.

TECHNICAL FIELD

The present disclosure relates to the technical field of isotope standard samples, and in particular to a synthetic cassiterite used as a standard substance for in-situ tin isotope testing, a preparation method thereof, and a method for in-situ tin isotope analysis using synthetic cassiterite.

BACKGROUND

The stable isotopic composition of tin (Sn) in terrestrial and meteorite samples has provided valuable insights into the early history of the solar system and fundamental geological processes. The primary focus of isotopic studies has been on cassiterite, the primary carrier of Sn in tin deposits. These deposits typically occur in association with granitic bases and form through magmatic hydrothermal activity.

Recent research has unveiled the presence of variations in Sn isotopes within individual cassiterite crystals, further highlighting the potential of in-situ Sn isotope ratios as a robust tool for tracing the intricate evolutionary pathways of tin-bearing magmatic-hydrothermal systems. By analyzing the Sn isotope ratios of cassiterites, valuable information about the origin and geological processes involved in the formation of these rocks are provided.

The use of multi-Colletor inductively coupled plasma mass spectrometer (MC-ICP-MS) enables precise and accurate determination of Sn isotope ratios with analytical precision surpassing 0.3‰ (2 Standard Deviation, 2SD). An example of its application is demonstrated in the study conducted by Clayton et al. (2002), where Sn isotope ratios in Sn metal and cassiterite solutions were determined using the Micromass IsoProbe MC-ICP-MS. Cassiterite, being largely insoluble in inorganic acids, necessitates a complex dissolution procedure to successfully dissolve it for analysis. This process involves converting cassiterite into acid-soluble tin metal through HI or high-temperature reduction methods. Recently, Mathur et al. (2017) conducted a comparison between the efficacy of high-temperature reduction using potassium cyanide and low-temperature reduction using hydriodic acid for cassiterite metal. The reduction of cassiterite metal using potassium cyanide at high temperatures has proven successful in determining Sn isotope ratios in cassiterite. However, the hydriodic acid method yields unreliable results due to Sn isotope fractionation during the reduction process.

While the Solution Nebulizer Multi-Collector Inductively Coupled Plasma Mass Spectrometer (SN-MC-ICP-MS) technique offers high accuracy for bulk isotope analysis, it is not suitable for analyzing cassiterite. This is primarily due to the multi-stage growth history and significant isotopic variations within individual cassiterite grains. Furthermore, the sample preparation process for cassiterite analysis using SN-MC-ICP-MS is complex, time-consuming, and involves the use of highly toxic potassium cyanide. Given the Sn isotopic heterogeneity and complex growth history of cassiterite, it is more beneficial to employ in-situ microregion analysis techniques, such as femtosecond laser ablation Multi-Collector Inductively Coupled Plasma Mass Spectrometry (fsLA-MC-ICP-MS), which offers high spatial resolution. Schulze et al. (2017) have successfully employed fsLA-MC-ICP-MS to directly determine the Sn isotope ratio in cassiterite, thereby bypassing the risk of isotopic fractionation during cassiterite reduction. However, it is important to calibrate the fsLA-MC-ICP-MS analysis against equivalent analysis of matrix-matched standards' standard curves to account for instrument-induced mass differences. Additionally, due to the significant challenges in finding natural cassiterite crystals with homogeneous Sn isotopes, exploring the synthesis of cassiterite crystals with uniform Sn isotopes is a worthwhile endeavor.

Therefore, it is necessary to provide a synthetic cassiterite used as a standard substance for in-situ tin isotope testing and a preparation method thereof. This synthetic cassiterite should exhibit homogeneous tin isotopes, enabling its use as a benchmark material to accurately and precisely determine tin isotope ratios in various samples.

SUMMARY

One or more embodiments of the present disclosure provide a method for preparing a synthetic cassiterite. The method comprises: grinding a natural cassiterite into ultrafine powder; and obtaining a synthetic cassiterite that can be used as a standard substance for in-situ determination of tin isotope ratios by sintering the ultrafine powder at a preset temperature and a preset pressure.

In some embodiments, the ultrafine powder has a D90 range of 1-7 μm and a D50 range of 1-2 μm.

In some embodiments, the grinding a natural cassiterite into ultrafine powder includes: obtaining an initial cassiterite powder by performing a primary grinding of the natural cassiterite; and obtaining the ultrafine powder by performing a secondary grinding of the initial cassiterite powder.

In some embodiments, a duration of the secondary grinding is in a range of 10-15 h, wherein the secondary grinding includes grinding for 2-8 min and cooling for 0.5-3 min alternately.

In some embodiments, the preset temperature is in a range of 600° C.-1000° C.

In some embodiments, the preset temperature is in a range of 700° C.-900° C.

In some embodiments, the preset pressure is in a range of 1-2 GPa.

In some embodiments, the preset pressure is 1 GPa.

In some embodiments, a duration for sintering the ultrafine powder at the preset temperature and the preset pressure is in a range of 2-5 h.

In some embodiments, the grinding a natural cassiterite into ultrafine powder includes: obtaining the ultrafine powder by grinding the natural cassiterite using at least one of a ball mill or a hand mill.

In some embodiments, the grinding a natural cassiterite into ultrafine powder includes: obtaining the ultrafine powder by grinding the natural cassiterite by at least one of wet grinding and dry grinding.

In some embodiments, the obtaining a synthetic cassiterite that can be used as a standard substance for in-situ determination of tin isotope ratios by sintering the ultrafine powder at a preset temperature and a preset pressure includes: loading the ultrafine powder into a platinum tube and compacting the ultrafine powder, sealing the platinum tube by soldering; heating the platinum tube containing the ultrafine powder for a preset time at the preset temperature and the preset pressure; and after completion of heating, cooling the platinum tube with the ultrafine powder to room temperature at the preset pressure.

In some embodiments, the method further includes: performing electron probe microanalysis and/or laser micro Raman analysis on the synthetic cassiterite and the natural cassiterite, wherein the synthetic cassiterite and the natural cassiterite have the same Raman spectrum, and the synthetic cassiterite has a uniform tin content in the synthetic cassiterite.

In some embodiments, the method further includes: performing a nanosecond laser ablation analysis of the synthetic cassiterite and the natural cassiterite, wherein the synthetic cassiterite and the natural cassiterite have the same signal intensity and signal distribution.

In some embodiments, the method further includes: performing SN-MC-ICP-MS analysis of the synthetic cassiterite and the ultrafine powder, wherein the synthetic cassiterite and the ultrafine powder have the same tin isotope ratio; and an average $\delta^{124}Sn/^{120}Sn$ determined by the SN-MC-ICP-MS analysis is 0.60±0.03 ‰(2SD, n=5) and used as a recommended $\delta^{124}Sn/^{120}Sn$ for the synthetic cassiterite.

In some embodiments, the method further includes: performing fsLA-MC-ICP-MS analysis of the synthetic cassiterite to obtain a precision of better than 0.1‰ for $\delta^{124}Sn/^{120}Sn$ (2SD) of the synthetic cassiterite.

In some embodiments, the method further includes: performing a reproducible analysis of the synthetic cassiterite, the synthetic cassiterite having an analytical reproducibility of $\delta^{124}Sn/^{120}Sn$ less than 0.1‰(2SD).

One or more embodiments of the present disclosure provide a synthetic cassiterite that is prepared by a method for preparing a synthetic cassiterite as described in any of the embodiments of the present disclosure.

One or more embodiments of the present disclosure provide a method for in-situ microregion analysis using the synthetic cassiterite. The method comprises: performing laser ablation on a sample to be measured and a standard substance, wherein the standard substance is the synthetic cassiterite; detecting tin isotope ratios of the ablated sample to be measured and the ablated standard substance; and determining a tin isotope content of the sample to be measured based on the tin isotope ratios of the ablated sample to be measured and the ablated standard substance and a tin isotope ratio of the standard substance relative to a reference substance.

In some embodiments, the isotopic ratio of the standard substance relative to the reference substance is determined by bulk solution analysis.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein:

FIG. 3(*b*) is an SEM image of a synthetic cassiterite prepared at a sintering temperature of 900° C.; FIG. 3(*c*) is an SEM image of the compacted powder particles;

FIG. 3(*d*) is a higher resolution SEM image of synthetic cassiterite prepared at a sintering temperature of 600° C.; FIG. 3(*e*) is an SEM image of recrystallized cassiterite crystals in synthetic cassiterite prepared at a sintering temperature of 900° C.; FIG. 3(*f*) is a comparison graph of the Raman spectra of synthetic cassiterite with the Raman spectra of natural cassiterite from the RRUFF (an integrated database of Raman spectra, X-ray diffraction and chemistry data for minerals); FIG. 3(*g*) and FIG. 3(*h*) illustrate the distribution of Sn and O elements in the synthetic cassiterite prepared at a sintering temperature of 600° C. as measured by electron probe microanalysis (EPMA), respectively;

DETAILED DESCRIPTION

The following is a brief description of the accompanying drawings that are required for use in the description of the embodiments. The accompanying drawings do not represent the full range of embodiments.

Unless the context clearly suggests an exception, the words "one", "a", "a kind" and/or "the" words do not refer specifically to the singular, but can also include the plural. In general, the terms "include" and "comprise" suggest only the inclusion of clearly identified steps and elements that do not constitute an exclusive list, and the method or device may also contain other steps or elements.

Figure 1:
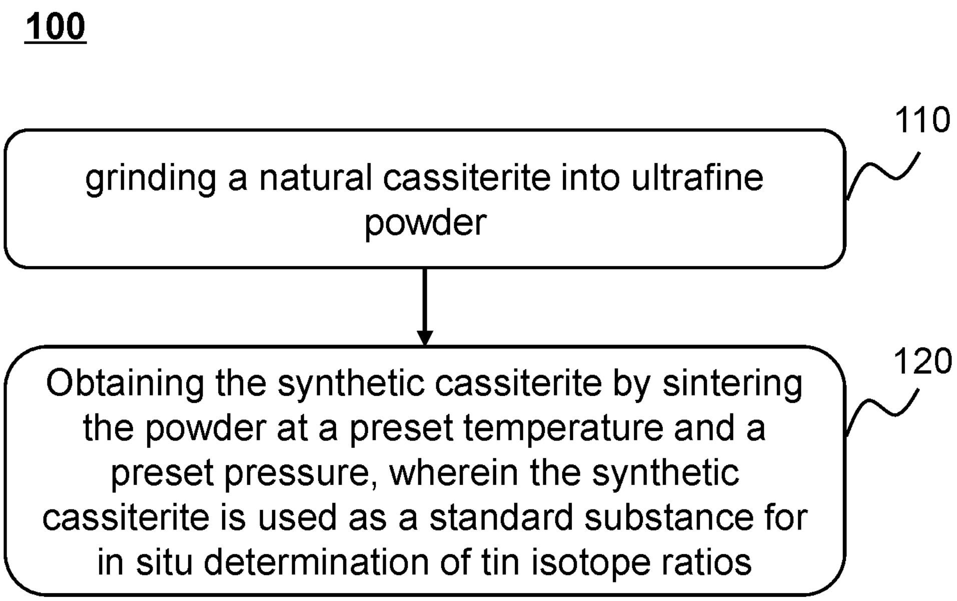
FIG. 1 is a flowchart illustrating an exemplary method for preparing a synthetic cassiterite according to some embodiments of the present disclosure.

FIG. 1 is a flowchart illustrating an exemplary process for preparing a synthetic cassiterite according to some embodiments of the present disclosure. As shown in FIG. 1, the process 100 includes the following steps.

Step 110, grinding a natural cassiterite into ultrafine powder.

The natural cassiterite may be collected from a tin metal deposit. In some embodiments, a weight of the natural cassiterite may range from 50 g to 100 g. In some embodiments, the weight of the natural cassiterite may range from 50 g to 80 g. In some embodiments, the weight of the natural cassiterite may range from 60 g to 70 g.

In some embodiments, the natural cassiterite may be automatically ground into ultrafine powder by a machine. For example, the natural cassiterite may be automatically ground into ultrafine powder by a ball mill. In some embodiments, the natural cassiterite may be manually ground into ultrafine powder. For example, the natural cassiterite may be ground into ultrafine powder by using an agate mortar. In some embodiments, the agate mortar may be a 50 ml-or 100 ml-agate mortar. In some embodiments, the ball mill may be a planetary ball mill (e.g., PM100, Retsch, Germany). In some embodiments, the ball mill may be a wet ball mill.

In some embodiments, the grinding a natural cassiterite into ultrafine powder may include obtaining an initial cassiterite powder by performing a primary grinding on the natural cassiterite, and obtaining the ultrafine powder by performing a secondary grinding on the initial cassiterite powder. In some embodiments, the primary grinding may include obtaining the initial cassiterite powder by grinding the natural cassiterite using an agate mortar, and the secondary grinding may include obtaining the ultrafine powder by grinding the initial cassiterite powder using a ball mill. In some embodiments, a duration of the secondary grinding may be in a range of 5-20 h, 8-18 h, 10-15 h, or 11-14 h. The secondary grinding may include alternating between grinding for 2-8 min and cooling for 0.5-3 min. In some embodiments, the duration of secondary grinding may be 12 h. The secondary grinding may include grinding for 3 min and cooling for 1 min alternately.

In some embodiments, the natural cassiterite may be ground into ultrafine powder by at least one of a wet grinding or a dry grinding. In some embodiments, the natural cassiterite may be ground into ultrafine powder by the wet grinding.

Additionally or alternatively, the method further includes drying the ultrafine powder obtained by the wet grinding. The use of the wet grinding can effectively reduce the particle size of the natural cassiterite and ensure the homogeneity of the synthetic cassiterite. In some embodiments, deionized water may be used as an auxiliary for grinding.

In some embodiments, a D90 (over 90%) range of the ground ultrafine powder may be 1-7 μm, and a D50 (over 50%) range may be 1-2 μm. In some embodiments, the D90 (over 90%) range of the ground ultrafine powder may be 2-6.6 μm and the D50 (over 50%) range may be 1-1.5 μm. In some embodiments, the D90 (over 90%) range of the ground ultrafine powder may be 3-6 μm and the D50 (over 50%) range may be 1-1.3 μm.

Step 120, obtaining the synthetic cassiterite by sintering the ultrafine powder at a preset temperature and a preset pressure, wherein the synthetic cassiterite is used as a standard substance for in-situ determination of tin isotope ratios (or "standard substance for in-situ tin isotope testing").

In some embodiments, the preset temperature may be in a range of 500° C.-1200° C., 600° C.-1000° C., 500° C.-900° C., or 600° C.-1100° C. In some embodiments, the preset temperature may be in a range of 600° C.-900° C. In some embodiments, the preset temperature may be in a range of 600° C.-800° C. In some embodiments, the preset temperature may be in a range of 700° C.-900° C. In some embodiments, the preset temperature may be in a range of 700° C.-800° C. In some embodiments, the preset temperature may be 500° C., 600° C., 700° C., 800° C., 900° C., 1000° C., or 1200° C.

In some embodiments, the preset pressure may be in a range of 1-2 GPa. In some embodiments, the preset pressure may be in a range of 1-1.5 GPa. In some embodiments, the preset pressure may be in a range of 1-1.2 GPa. In some embodiments, the preset pressure may be 1 GPa, 1.2 GPa, 1.5 GPa, or 2 GPa.

In some embodiments, the obtaining a synthetic cassiterite by sintering the ultrafine powder at a preset temperature and a preset pressure includes: loading the ultrafine powder into a platinum tube and compacting the ultrafine powder, sealing the platinum tube by soldering; heating the platinum tube containing the ultrafine powder for a preset time at the preset temperature and the preset pressure; and cooling the platinum tube with the ultrafine powder to room temperature at the preset pressure.

In some embodiments, the preset time may be in a range of 2-5 h. In some embodiments, the preset time may be in a range of 2-4 h. In some embodiments, the preset time may be in a range of 3-3.5 h. In some embodiments, the preset time may be in a range of 3-3.5 h.

In some embodiments, electron probe microanalysis (EPMA) and/or laser micro Raman analysis may also be performed on the synthetic cassiterite and the natural cassiterite. In some embodiments, the Raman spectra of the synthetic cassiterite and the natural cassiterite are identical. In some embodiments, the tin content of the synthetic cassiterite is homogeneous.

In some embodiments, nanosecond laser ablation analysis may also be performed on the synthetic cassiterite and the natural cassiterite. In some embodiments, the signal intensity and signal distribution of the synthetic cassiterite and the natural cassiterite are identical.

In some embodiments, SN-MC-ICP-MS analysis may also be performed on the synthetic cassiterite and the ultrafine powder. In some embodiments, the synthetic cassiterite and the ultrafine powder have the same tin isotope ratio.

In some embodiments, the synthetic cassiterite may also be analyzed by fsLA-MC-ICP-MS to determine a precision of the tin isotope ratio $\delta^{124}Sn/^{120}Sn$ (2SD) of the synthetic cassiterite. In some embodiments, the precision of the tin isotope $\delta^{124}Sn/^{120}Sn$ (2SD) of the synthetic cassiterite is obtained to be 0.1‰. In some embodiments, the precision of the tin isotope $\delta^{124}Sn/^{120}Sn$ (2SD) of the synthetic cassiterite is obtained to be better than 0.1‰. In some embodiments, the precision of the tin isotope $\delta^{124}Sn/^{120}Sn$ (2SD) of the synthetic cassiterite is obtained to be better than 0.08‰. In some embodiments, the precision of the tin isotope $\delta^{124}Sn/^{120}Sn$ (2SD) of the synthetic cassiterite is obtained to be better than 0.09‰. In some embodiments, the precision of the tin isotope $\delta^{124}Sn/^{120}Sn$ (2SD) of the synthetic cassiterite is obtained to be better than 0.13‰. In some embodiments, the precision of the tin isotope $\delta^{124}Sn/^{120}Sn$ (2SD) of the synthetic cassiterite is obtained to be better than 0.15‰. In some embodiments, the precision of the tin isotope $\delta^{124}Sn/^{120}Sn$ (2SD) of the synthetic cassiterite is greater than 0.17‰.

In some embodiments, the synthetic cassiterite may also be analyzed reproducibly with an analytical reproducibility of less than 0.10‰ (2SD, $\delta^{124}Sn/^{120}Sn$) for the synthetic cassiterite. In some embodiments, the analytical reproducibility of the synthetic cassiterite is less than 0.08‰ (2SD, $\delta^{124}Sn/^{120}Sn$). In some embodiments, the analytical reproducibility of the synthetic cassiterite is less than 0.07‰ (2SD, ($\delta^{124}Sn/^{120}Sn$).

One or more embodiments of the present disclosure also provide a synthetic cassiterite which may be prepared by the method for preparing a synthetic cassiterite described in the present disclosure.

Figure 2:
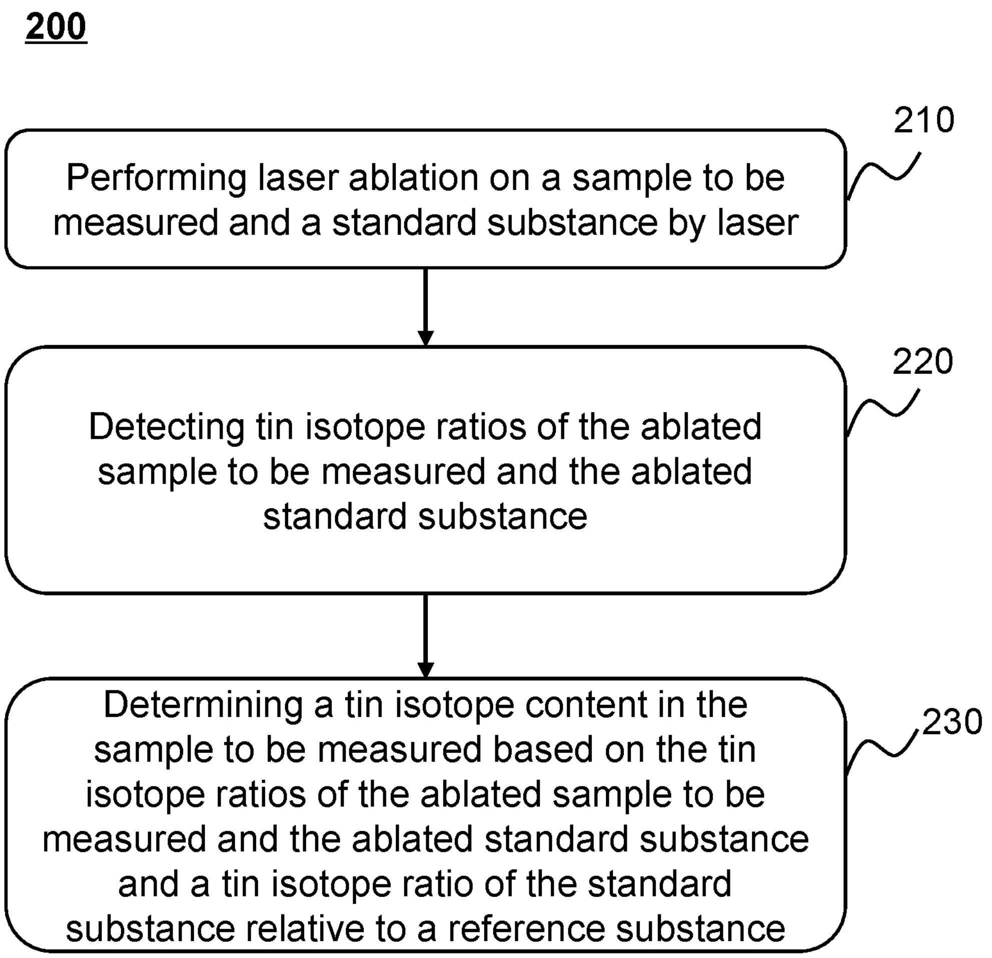
FIG. 2 is a flowchart illustrating an exemplary method for in-situ microregion analysis using a synthetic cassiterite according to some embodiments of the present disclosure.

FIG. 2 is a flowchart illustrating an exemplary method for in-situ microregion analysis using a synthetic cassiterite according to some embodiments of the present disclosure. As shown in FIG. 2, process 200 includes the following steps.

Step 210, performing laser ablation on a sample to be measured and a standard substance by laser, wherein the standard substance is the synthetic cassiterite.

In some embodiments, the sample to be measured and the standard substance may be ablated by a laser. The standard substance may be the synthetic cassiterite prepared described above.

The sample to be measured is a cassiterite that needs to be measured for tin isotope content.

The laser may be a Neptune Plus™ MC-ICP-MS coupled NWR Femto UC dualwave femtosecond laser. The femtosecond laser ablation system consists of a photoconverting pharos HE laser, a laser delivery system, an airflow control system, a sample station, a microscope system, and a software control system. The pharos HE laser has a fundamental wavelength in the near infrared (1028 nm) and operates at a fourth harmonic wavelength of 257 nm and a fifth harmonic wavelength of 206 nm.

In some embodiments, the step 210 may be performed under an inert gas. In some embodiments, the inert gas may include, for example, helium.

Step 220, detecting tin isotope ratios of the ablated sample to be measured and the ablated standard substance.

Step 230, determining a tin isotope content in the sample to be measured based on the tin isotope ratios of the ablated sample to be measured and the ablated standard substance and a tin isotope ratio of the standard substance relative to a reference substance.

In some embodiments, the Sn isotopic content of the sample to be measured may be determined based on the Sn isotopic ratios of the ablated sample to be measured and the ablated standard substance and the Sn isotopic ratio of the standard substance relative to the reference substance.

The reference substance is an international reference substance used to measure the isotopic content of the standard substance, which contains the element Sn in addition to other elements such as iron.

In some embodiments, the standard substance may be used as an external standard for the sample to be measured. Merely by way of example, the tin isotopic content of the sample to be measured is calculated by the following equation: $\delta^{124}Sn_{NIST3161a}=[(^{124}Sn/^{116}Sn_{sample})/(^{124}Sn/^{116}Sn)_{Cst\text{-}600}-1]\times1000+\delta^{124/116}Sn_{NIST3161a}$, where $\delta^{124}Sn_{NIST3161a}$ represents the value of $\delta^{124}Sn$ of the sample to be measured relative to the reference substance NIST SRM 3161a; $^{124}Sn/^{116}Sn_{sample}$ is the actually-measured isotope ratio in the sample to be measured; $(^{124}Sn/^{116}Sn)_{Cst\text{-}600}$ is the isotopic ratio of the actually-measured standard substance; $\delta^{124/116}Sn_{NIST3161a}$ is the isotopic ratio of the standard substance relative to the reference substance NIST SRM 3161a. In some embodiments, the tin isotopic ratio of the standard substance relative to the reference substance may be determined by bulk solution analysis.

Instrument and reagents used in the following examples include deionized water with a resistivity of 18.0 $M\Omega\cdot cm^{-1}$, obtained from Milli-Q Water Purification Systems (Millipore, Bedford, MA, USA). The international Sn isotope standard, NIST SRM 3161a, purchased from the National Institute of Standards and Technology, USA, contained 5% $HNO_3$ and 1% HF. Two commercially available single-element standard solutions, Spex CetriPrep Sn solution and $SnCl_4$ solution, were used to check the stability of MC-ICP-MS. Repeated measurements of the Spex CetriPrep Sn solution standard (lot #CL11-154SNY) were performed for comparisons and to monitor the stability of the instrument.

Example 1: Synthetic Cassiterite

In some embodiments, the natural cassiterite may be collected from a tin metal deposit in the western part of the tin ore belt in southeastern Yunnan, southwestern China.

(1) Acquisition of Ultrafine Powder

Initial cassiterite powder was obtained by grinding natural cassiterite using an agate mortar in the State Key Laboratory of Continental Dynamics (SKLCD), and most of the initial cassiterite powder obtained was about 75 μm in size. The initial cassiterite powder was further ground using a planetary ball mill (PM100, Retsch, Germany) with a 50 mL agate jar and agate balls based on laser ablation microzonation analysis. The initial cassiterite powder was ground using a wet grinding method, and deionized water was used as an auxiliary for a ball mill suspension. 50-100 g of the initial cassiterite powder was taken and ground for 12 hours, including 3 minutes of grinding and 1 minute of cooling intervals to allow the large and heavy particles to settle. The suspension containing the ultrafine powder and deionized water was dried overnight on a heating plate at 80° C. The next morning the dry powder was manually ground using an agate mortar for 30 min before grain analysis. The ultrafine powder was obtained after the ultrafine process. The final cassiterite powder exhibited a particle size reduction, with a D50 value of 1.3 μm and the majority of particles at D90 measuring less than 6.6 μm. These dimensions render the powder suitable for laser ablation, as it attains a fine consistency.

(2) Preparation of Synthetic Cassiterite

Approximately 0.5 g of ultrafine powder was packed into a 2 mm diameter platinum tube, which had been pre-cleaned with alcohol. After compacting the ultrafine powder, the platinum tube with the ultrafine powder was soldered and sealed. The sealed sample was then loaded into a Quickpress Piston Cylinder. Considering the high melting point of ultrafine powder, the sintering temperatures for the synthesis experiments were carried out at 300° C., 600° C., 800° C., 900° C. and 1000° C. The cassiterite powder was heated at high pressure of 1 Ga for 3 h and then cooled to room temperature to obtain synthetic cassiterite.

Firstly, synthetic cassiterite was cut into two halves using STX-202A diamond wire saw (Shenyang Kexing Automotive Instruments Co., Ltd.) and poured into two epoxy resin targets. The two epoxy resin targets were polished 3 times with gradually finer diamond paste (from 9 μm to 1 μm). The polished epoxy targets were then cleaned with deionized water and placed on an electric heating plate and heated at 50° C. for 30 minutes. Two microdrill samples were drilled from one of the epoxy resin targets using microdrill sampling (RELION INDUSTRIES, USA) to determine the Sn isotope ratio using bulk solution analysis. The other epoxy target was then carbon coated prior to electron probe microanalysis (EPMA).

Example 2: Electron Probe Microscopy and Laser Micro Raman Analysis

Synthetic cassiterite with carbon coating was analyzed by laser micro Raman with inVia-Reflex. The laser wavelength was 543 nm and the spectral resolution was 1 $cm^{-1}$. The synthetic cassiterite was then analyzed using a LEO 1450VP Scanning Electron Microscope (SEM) equipped with an Energy Dispersive Spectroscopy (EDS).

In SKLCD, the main elements of cassiterite were analyzed mainly using an electron probe microanalyzer (EPMA: JEOLJXA-8230). The EPMA instrument was equipped with five spectrometers and analyzed at an accelerating voltage of 15 kV, a beam current of 10 nA, and a beam diameter of 2 μm. Natural cassiterite is used as a standard material for quantifying the Sn signal. High-resolution 2D elemental X-ray diffraction was applied to synthetic cassiterite. Diffraction was performed using the same EPMA with an acceleration voltage of 15 kV, a beam current of 50 nA, and a beam diameter of 3 μm. The dwell time for each spot was set to 50 ms. Tin Kα was analyzed using LIFH crystals.

Figure 3:
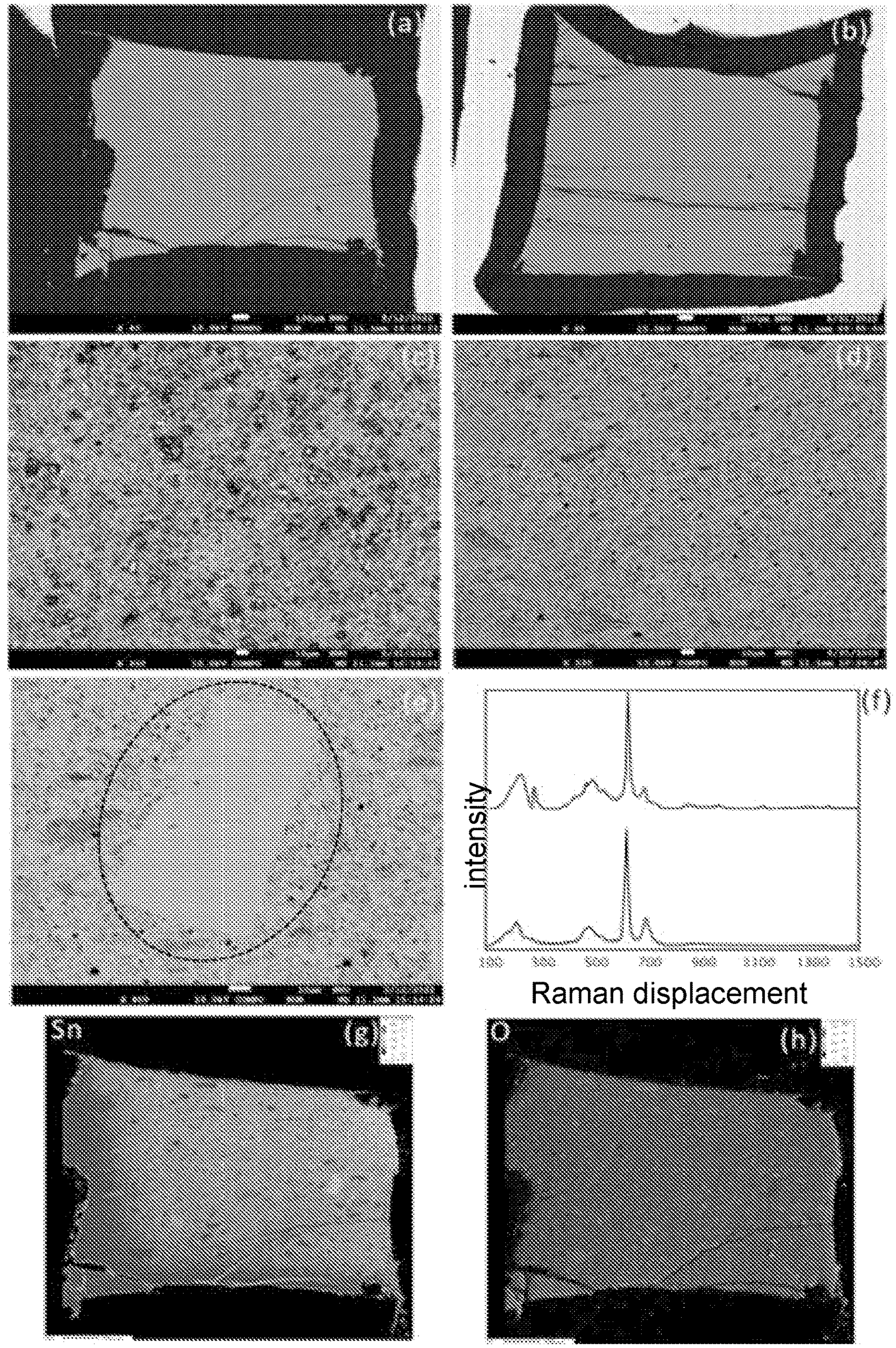
FIGS. 3(*a*)-3(*h*) illustrate SEM images, Raman spectra and element distribution images, respectively, according to some embodiments of the present disclosure, where FIG. 3(*a*) is an SEM image of a synthetic cassiterite prepared at a sintering temperature of 600° C.

Experimental results: As confirmed by laser micro Raman spectroscopy (FIG. 3(*f*)), the synthesized products were cassiterite, recrystallized crystals and fused cassiterite glass. The Raman spectra of the synthetic cassiterite were identical to those of the natural cassiterite in the RRUFF database. The curve at the lower side in FIG. 3(*f*) is the Raman spectrum of natural cassiterite from the RRUFF database, and the curve at the upper side is the Raman spectrum of synthetic cassiterite. The sintering temperatures of cassiterite powders were systematically investigated at 300° C., 600° C., 800° C., 900° C. and 1000° C. The surface morphologies of the synthetic cassiterite and pressed powder particles prepared at different sintering temperatures are shown in FIGS. 3(*a*)-3(*e*). In FIG. 3(*c*), it is shown that there are no cracks and scratches on the surface of the pressed powder particles, but there are some micron-sized particles. At low sintering temperatures (e.g., 300° C.), the cassiterite samples were not gelled and could not be polished. When the sintering temperatures were increased to 600° C. and 900° C., the surfaces of the synthetic cassiterite prepared at 600° C. and 900° C. sintering temperatures became smooth and dense, as shown in FIGS. 3(*a*) and 3(*b*). In FIG. 3(*d*), it is shown that the synthetic cassiterite prepared at 600° C. sintering temperature mainly consists of molten cassiterite glass and some recrystallized cassiterite. Compared with FIG. 3(*d*), the number of recrystallized cassiterite crystals is significantly increased in FIG. 3(*e*). The dashed circled part in FIG. 3(*e*) shows recrystallized cassiterite crystals, which proves that the number of recrystallized cassiterite crystals can be significantly increased when the sintering temperature is increased to 900° C. As shown in FIG. 3(*f*), the Raman spectra of synthetic cassiterite is consistent with the Raman spectra of natural cassiterite from the RRUFF database, and the energy spectrum data indicates that the recrystallized crystals in synthetic cassiterite are all cassiterite. As shown in FIG. 3(*g*) and FIG. 3(*h*), the EDS analysis shows the homogeneity of the synthetic cassiterite and detects small amounts of Si and Al, which may been introduced during the grinding and polishing process. Elemental distribution mapping was performed for the whole synthetic cassiterite, and the distribution of Sn and O elements in the synthetic cassiterite prepared at the sintering temperature of 600° C. measured by EPMA is shown in FIG. 3(*g*) and FIG. 3(*h*). FIG. 3(*g*) and FIG. 3(*h*) do not show the Sn distribution from the edge to the core region, which proves the overall homogeneity of the synthetic cassiterite. Finally, a total of 17 EPMA measurements were performed on the synthetic cassiterite including recrystallized crystals and fused cassiterite glass, and the results are shown in Table 1. The quantitative compositional analysis shows that the Sn content is homogeneous.

TABLE 1

EPMA measurements of the major elements in recrystallized cassiterite crystals and cassiterite glasses

| Sample Serial Number | $Al_2O_3$ (%) | $SiO_2$ (%) | $SnO_2$ (%) |
|---|---|---|---|
| Recrystallized crystal 01 | 0.02 | 0.10 | 99.88 |
| Recrystallized crystal 02 | 0.00 | 0.08 | 99.92 |
| Recrystallized crystal 03 | 0.01 | 0.09 | 99.90 |
| Recrystallized crystal 04 | 0.00 | 0.03 | 99.96 |
| Recrystallized crystal 05 | 0.01 | 0.07 | 99.92 |
| Recrystallized crystal 06 | 0.00 | 0.10 | 99.90 |
| Glass 01 | 0.01 | 0.04 | 99.94 |
| Glass 02 | 0.06 | 0.08 | 99.87 |
| Glass 03 | 0.10 | 0.28 | 99.62 |
| Glass 04 | 0.00 | 0.36 | 99.63 |
| Glass 05 | 0.11 | 0.36 | 99.53 |
| Glass 06 | 0.02 | 0.20 | 99.78 |
| Glass 07 | 0.12 | 0.30 | 99.58 |
| Glass 08 | 0.01 | 0.20 | 99.79 |
| Glass 09 | 0.00 | 0.07 | 99.93 |
| Glass 10 | 0.00 | 0.15 | 99.85 |
| Glass 11 | 0.14 | 0.30 | 99.57 |

Example 3: Nanosecond Laser Ablation Analysis

Following the EPMA analysis, nanosecond laser ablation studies were performed on natural and synthetic cassiterite. Point ablation mode using a Laser Ablation Inductively Coupled Plasma Mass Spectrometer (LA-ICP-MS) with a point size of 43 μm, a frequency of 4 Hz, and a laser energy density of 6 J-cm-2.

Figure 4:
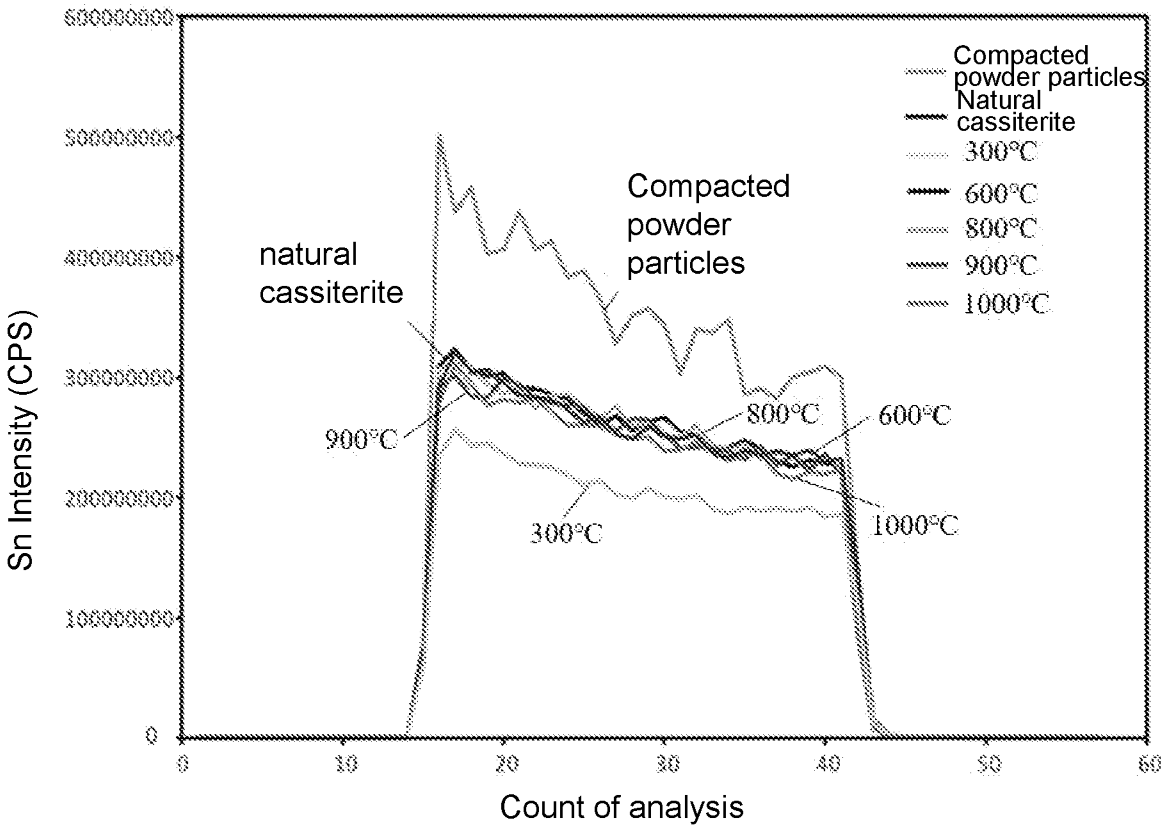
FIG. 4 is a graph illustrating the analysis result of the Sn ablation signals of natural cassiterite, pressed powder particles and five synthetic cassiterites prepared at different sintering temperatures using LA-ICP-MS point ablation mode according to some embodiments of the present disclosure.

Experimental results: FIG. 4 is a graph illustrating the analysis result of the Sn ablation signals of natural cassiterite, pressed powder particles and synthetic cassiterite prepared at different sintering temperatures using LA-ICP-MS point ablation mode according to some embodiments of the present disclosure. As shown in FIG. 4, the signal curve of the pressed powder particles shows the highest signal intensity, the synthetic cassiterite prepared at 300° C. sintering temperature shows the lowest signal intensity, and the synthetic cassiterite prepared at 600° C., 800° C., 900° C., and 1000° C. sintering temperatures is closer to the signal intensity of the natural cassiterite.

FIG. 4 shows that the signal curves of the pressed powder particles are similar to those of natural and synthetic cassiterite. However, the pressed powder particles show the highest signal intensity, which is about 1.3 times higher than that of natural cassiterite. The relatively low mechanical resistance in the pressed powder particles leads to higher ablation rates and higher signal intensities. Synthetic cassiterite prepared at a sintering temperature of 300° C. has the lowest signal intensity, which is about 0.8 times lower than that of natural cassiterite. As the sintering temperature increased, the signal intensity and signal distribution of synthetic cassiterite at 600° C., 800° C., 900° C. and 1000° C. were consistent with that of natural cassiterite. The consistent signal intensity and signal distribution of synthetic cassiterite prepared at sintering temperatures of 600-1000° C. with natural cassiterite indicates that the synthetic cassiterite material prepared at this sintering temperature is close to the theoretical maximum density.

Example 4: SN-MC-ICP-MS Analysis

The micdrilled sample obtained in example 1 was mixed with ultrapure potassium cyanide. The mixed sample was loaded into a closed graphite container and placed in a corundum bowl with zero open porosity. The corundum bowl was filled with activated carbon and covered with a corundum lid. Then, the whole was roasted in a muffle furnace at 1000° C. The resulting tin beads were dissolved in a mixture of 2 ml HCl (6 mol/$L^{-1}$) and 0.2 ml $H_2O_2$, and the mixture was packed in a closed Savillex@ bottle to obtain dilute tin metal solutions. The dilute tin metal solutions were then measured directly using Thermo Scientific Neptune Plus MC-ICP-MS. L4, L3, L2, L1, C, H1, H2, H3, and H4 Faraday cups were used to collect $^{116}$Sn, $^{117}$Sn, $^{118}$Sn, $^{119}$Sn, $^{120}$Sn, $^{121}$Sb, $^{122}$Sn, $^{123}$Sb, and $^{124}$Sn, respectively. The standard+sample+standard (SSB) method combined with Spexpure Sb solution as the internal standard material was chosen to correct for instrument mass bias. Sn isotope standard NIST SRM 3161a was used as the standard material. Each analysis consisted of 120 analytical test points with an integration time of 8.4 s per point.

Experimental results: Two micdrilled samples of synthetic cassiterite and one initial cassiterite powder sample were analyzed for Sn isotope ratios, and the results of bulk Sn isotope measurements are shown in Table 2. The $\delta^{124}$Sn/$^{120}$Sn of the two micdrilled samples were 0.62±0.03‰ (2SD, n=2) and 0.59±0.03‰ (2SD, n=2), respectively, which were in agreement with the initial cassiterite powder sample (0.61±0.01‰). The good agreement indicates that there is no significant Sn isotope fractionation in synthetic cassiterite during high temperature sintering. Therefore, the average $\delta^{124}$Sn/$^{120}$Sn determined by lots of SN-MC-ICP-MS measurements was 0.60±0.03‰ (2SD, n=5), which is recommended as the $\delta^{124}$Sn/$^{120}$Sn for synthetic cassiterite.

Repeated measurements were performed on multiple Sn solution standards prior to fsLA-MC-ICP-MS analysis to check instrument stability. For the purpose of comparison between multiple laboratories, the average $\delta^{122}$Sn/$^{116}$Sn of Spex CertiPrep Sn and $SnCl_4$ solutions were 0.43±0.04‰ (2SD, n=45) and 0.14±0.07‰ (2SD, n=46), respectively, in agreement with published values. The average $\delta^{124}$Sn/$^{120}$Sn of Spex CetriPrep Sn solution standard (lot CL11-154SNY) at five stages were −0.14±0.05‰(2SD, n=30), −0.13±0.03‰ (2SD, n=20), −0.14±0.04‰ (2SD, n=31), −0.14±0.05‰ (2SD, n=18) and −0.12±0.05‰ (2SD, n=44). The good precision and accuracy confirmed the stability of the instrument for fsLA-MC-ICP-MS in-situ Sn isotope analysis.

Example 5: fsLA-MC-ICP-MS Analysis

In the SKLCD, the Neptune Plus™ MC-ICP-MS was coupled to a NWRFemtoUC Dualwave femtosecond laser ablation (ESI, USA) for in-situ Sn isotope analysis. The femtosecond laser ablation system consists of the Light Conversion PharosHE laser, laser delivery system, airflow control system, sample stage, microscope system, and software control system. The pharos laser is equipped with a fundamental NIR wavelength (1028 nm) and operates at 257 nm UV wavelength generated at quadruple frequency and 206 nm wavelength generated at quintuple frequency. The spot size is between 1 and 65 μm based on a continuously adjustable aperture. Laser ablation was performed under He atmosphere in the ablation chamber, while Ar gas was mixed into the sample exit line downstream of the ablation chamber before entering the MC-ICP-MS. All microanalytical measurements were performed in line scan mode and lasted 148 seconds, which included 30 seconds of background measurement, 58 seconds of data acquisition, and 60 seconds of elution. The length of the ablation line used in the experiment was approximately 60 μm.

For in-situ Sn isotope analysis, $^{116}$Sn, $^{119}$Sn, $^{120}$Sn, $^{121}$Sb, $^{122}$Sn, $^{123}$Sb, $^{124}$Sn, and $^{125}$Te were collected using cups L4, L2, L1, C, H1, H2, H3, and H4, respectively. The $^{125}$Te signal is measured to remove potential isotopic interference of $^{120}$Te to $^{120}$Sn, $^{122}$Te to $^{122}$Sn, and $^{124}$Te to $^{124}$Sn. In this case, the natural abundance ratio of Te may be used to calculate the interference of Te to Sn: $^{120}$Te/$^{125}$Te=0.01400, $^{122}$Te/$^{125}$Te=0.36415, and $^{124}$Te/$^{125}$Te=0.67507. The SSB method was chosen to correct for instrument mass bias, and all measurements were performed at moderate mass resolu-

TABLE 2

Sn isotope ratios of cassiterite samples

| Sample ID | $\delta^{116}$Sn/$^{120}$Sn | 2SD | $\delta^{117}$Sn/$^{120}$Sn | 2SD | $\delta^{118}$Sn/$^{120}$Sn | 2SD | $\delta^{119}$Sn/$^{120}$Sn | 2SD | $\delta^{122}$Sn/$^{120}$Sn | 2SD | $\delta^{124}$Sn/$^{120}$Sn | 2SD | $\delta^{124}$Sn/$^{116}$Sn | 2SD | $\delta^{122}$Sn/$^{1116}$Sn | 2SD |
|---|---|---|---|---|---|---|---|---|---|---|---|---|---|---|---|---|
| Micdrilled Cassiterite | −0.61 | 0.02 | −0.48 | 0.01 | −0.30 | 0.01 | −0.16 | 0.01 | 0.28 | 0.02 | 0.58 | 0.01 | 1.19 | 0.01 | 0.89 | 0.02 |
| Micdrilled Cassiterite | −0.64 | 0.02 | −0.48 | 0.01 | −0.31 | 0.00 | −0.17 | 0.01 | 0.30 | 0.01 | 0.60 | 0.02 | 1.23 | 0.03 | 0.94 | 0.02 |
| Micdrilled Cassiterite | −0.67 | 0.01 | −0.51 | 0.01 | −0.32 | 0.01 | −0.17 | 0.01 | 0.32 | 0.02 | 0.61 | 0.01 | 1.27 | 0.00 | 0.99 | 0.02 |
| Micdrilled Cassiterite | −0.68 | 0.01 | −0.52 | 0.01 | −0.33 | 0.02 | −0.18 | 0.01 | 0.33 | 0.00 | 0.63 | 0.02 | 1.30 | 0.01 | 1.01 | 0.01 |
| Initial cassiterite powder | −0.65 | 0.03 | −0.49 | 0.02 | −0.31 | 0.01 | −0.17 | 0.02 | 0.32 | 0.01 | 0.61 | 0.01 | 1.25 | 0.03 | 0.97 | 0.04 |
| Mean | −0.65 | 0.05 | −0.50 | 0.03 | −0.32 | 0.02 | −0.17 | 0.02 | 0.31 | 0.04 | 0.60 | 0.03 | 1.25 | 0.09 | 0.96 | 0.09 |

tion (~4000). Each in-situ Sn isotope measurement was performed in time-resolved mode (meaning 0.524 s per measurement), with 100 cycles collected every 0.524 s. The elution time between two Sn isotope measurements was 60 seconds. The backgrounds obtained on $^{116}Sn$, $^{119}Sn$, $^{120}Sn$, $^{121}Sb$, $^{122}Sn$, $^{123}Sb$, $^{124}Sn$, and $^{125}Te$ were less than 0.1 mV, 0.5 mV, 3 mV, 2 mV, 1 mV, 2 mV, and 2 mV, respectively. In the in-situ analysis of cassiterite, the signal intensity of $^{125}Te$ is less than 3 mV, and the measured signal intensity of $^{120}Te$, $^{122}Te$, and $^{124}Te$ were less than 1 mV. Therefore, the interference of Te does not affect the Sn isotope measurements. Finally, the Sn isotope ratios were first expressed as deviations per million relative to the bracketing standard and then converted to values relative to the Sn isotope standard NIST SRM 3161 a. Table 3 summarizes the detailed instrument parameters for the NWRFemtoUC Dualwave femtosecond laser ablation.

TABLE 3

Instrument parameters of SN-MC-ICP-MS and fsLA-MC-ICP-MS for Sn isotope measurements

| | |
|---|---|
| Mass Spectrometry | Neptune Plus ™ |
| RF forward power | 1200W |
| Interface cones | Nickel standard sampler cones and "H" skimmer cone |
| Cooling gas | 15 L $min^{-1}$ |
| Auxiliary gas | 0.8 L $min^{-1}$ |
| Sample gas | 1.05 L $min^{-1}$ |
| Resolution mode | Medium resolution |
| Sensitivity | ~15 V for $^{120}Sn$ |
| Integral time | 4.194 s for SN-MC-ICP-MS analysis; 0.524 s for LA-MC-ICP-MS analysis |
| Laser ablation system | |
| Laser Type | Light Conversions, Pharos HE Inc. |
| Output wavelength | 206 nm |
| Energy Density | 0.6 J $cm^{-2}$ |
| Laser beam | 20 μm |
| Frequency | 6 Hz |
| Pulse | 348 |
| Gas Carrier | 450 mL·$min^{-1}$ |
| Ablation pattern and duration | Line scan, 58 s |

Figure 5:
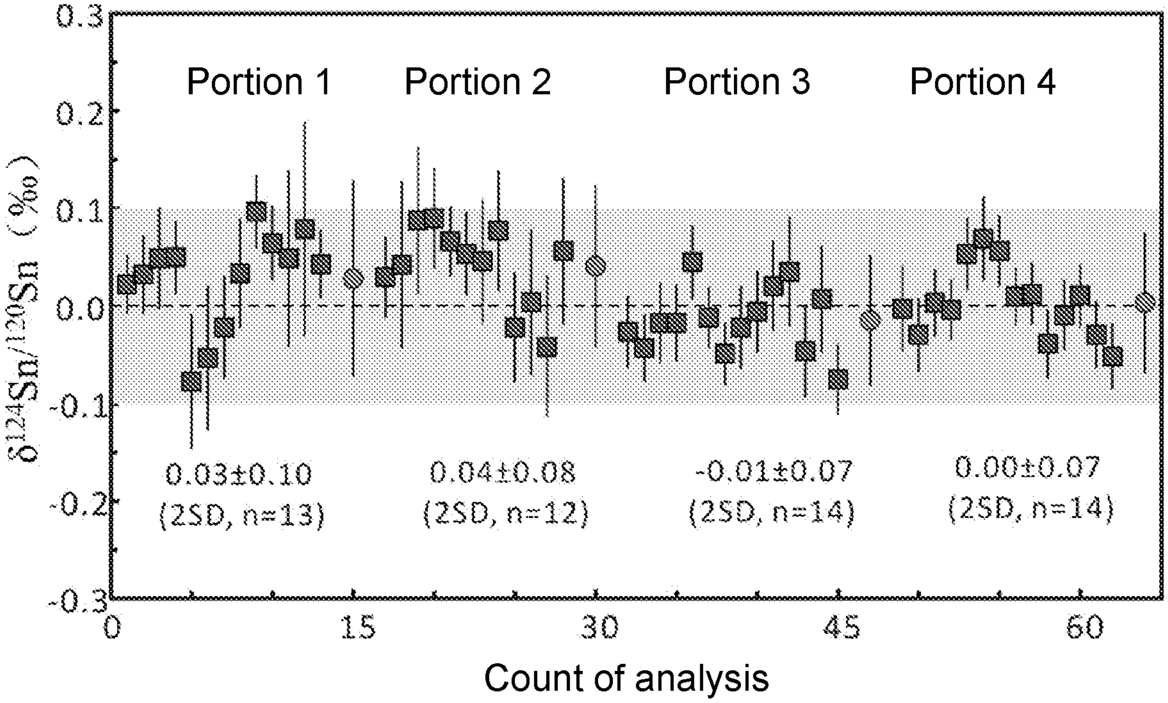
FIG. 5 is a graph illustrating the results of $\delta^{124}Sn/^{120}Sn$ measurements of synthetic cassiterite according to some embodiments of the present disclosure, where portions 1-2 are selected along the dashed lines (vertical and horizontal directions) on the cross-section in FIG. 3(*a*) and portions 3-4 are selected along the dashed lines (vertical and horizontal directions) on the cross-section in FIG. 3(*b*); the circles indicate the average $\delta^{124}Sn/^{120}Sn$ values for each portion and the error bars represent 2 standard errors.

Experimental results: Based on the above morphology and laser ablation results, the homogeneity of the Sn isotopic composition of synthetic cassiterite at 600° C. and 900° C. was measured. Due to the lack of standard samples of cassiterite, one-half of the synthetic cassiterite prepared at 600° C. sintering temperature was used as a standard to determine the Sn isotope ratio in synthetic cassiterite along the dashed lines in the cross sections of FIG. 3(*a*) and FIG. 3(*b*). FIG. 5 shows the Sn isotope ratios at different positions in synthetic cassiterite prepared at different sintering temperatures. Portion 1 and portion 2 show the Sn isotope ratios determined along the dashed lines on the cross section (vertical and horizontal directions) in FIG. 3(*a*), i.e., the Sn isotope ratios in synthetic cassiterite prepared at a sintering temperature of 600° C.; portion 3 and portion 4 are the Sn isotope ratios determined in FIG. 3(*b*) along the dashed lines on the cross section (vertical and horizontal directions), i.e., the Sn isotope ratios of the synthetic cassiterite prepared at a sintering temperature of 900° C.

A total of 25 fsLA-MC-ICP-MS measurements were performed on synthetic cassiterite prepared at a sintering temperature of 600° C. and a total of 28 fsLA-MC-ICP-MS measurements were performed on synthetic cassiterite prepared at a sintering temperature of 900° C. to investigate the homogeneity, as shown in FIG. 5. Portion 1 includes 13 Sn isotope measurements on synthetic cassiterite prepared at a sintering temperature of 600° C., yielding $\delta^{124}Sn/^{120}Sn$ values ranging from −0.08‰ to 0.10‰ with an average value of 0.03±0.10‰ (2SD, n=13). The in-situ Sn isotope measurements in portion 2 yielded $\delta^{124}Sn/^{120}Sn$ values of −0.04‰ to 0.09‰ with an average value of 0.04±0.08‰ (2SD, n=12). In-situ Sn isotope measurements in portion 3 and portion 4 yielded $\delta^{124}Sn/^{120}Sn$ values of −0.08‰ to 0.07‰ with average values of −0.01±0.07‰(2SD, n=14) and −0.00±0.07‰ (2SD, n=14), respectively.

The precision (expressed as 2SD) of $\delta^{124}Sn/^{120}Sn$ in the above four portions determined using fsLA-MC-ICP-MS was better than 0.10‰ without systematic variation, demonstrating the homogeneity of the synthetic cassiterite and indicating good tin isotopic homogeneity of the synthetic cassiterite.

In addition, the Sn isotope ratios of recrystallized crystals were determined by using cassiterite glass as a standard alone. The cassiterite glass was a synthetic cassiterite prepared at a sintering temperature of 900° C. The $\delta^{124}Sn/^{120}Sn$ values for the 12 recrystallized crystals (i.e., 12 Sn isotopic ratios were obtained by testing the recrystallized cassiterite crystals) ranged from −0.02‰ to 0.06‰ with an average value of 0.02±0.06‰ (2SD, n=12), indicating that there was no significant Sn isotopic fractionation between the recrystallized crystals and the cassiterite glass, i.e., there is no change in the isotopes of the recrystallized and uncrystallized parts of synthetic cassiterite.

Figure 6:
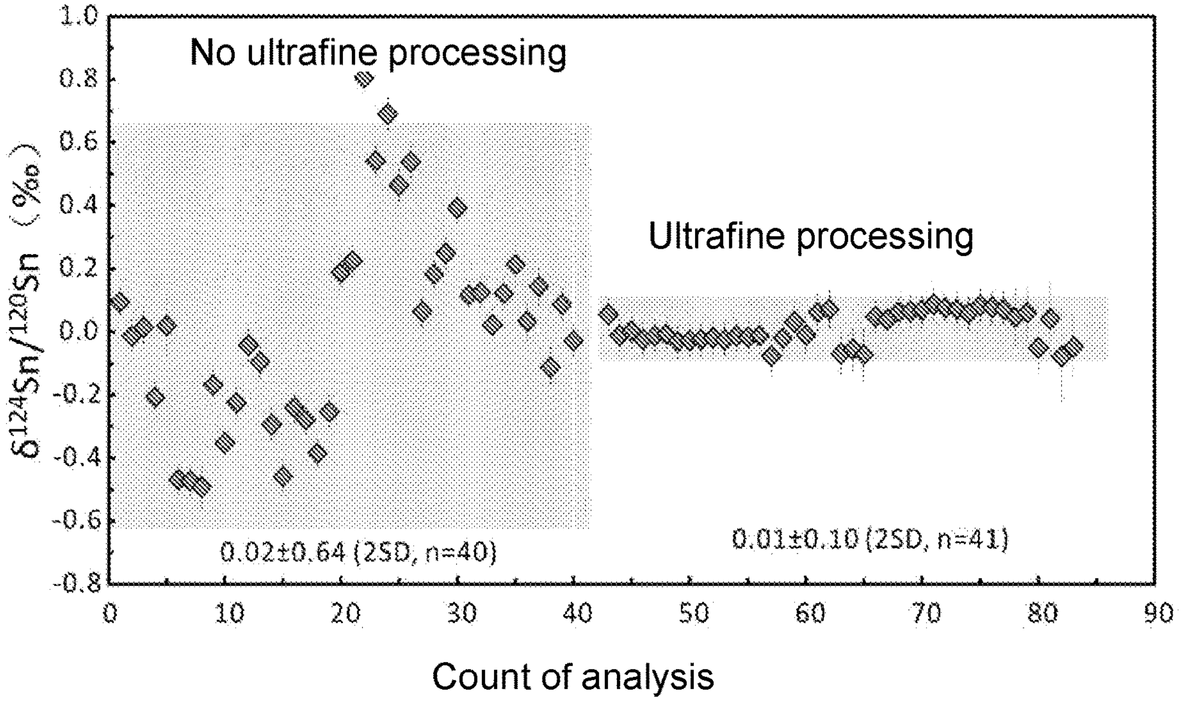
FIG. 6 is a graph illustrating $\delta^{124}Sn/^{120}Sn$ values for natural and synthetic cassiterite according to some embodiments of the present disclosure, where the error bars represent 2 times the standard error and the error bars of the mean represent 2SD.

The $\delta^{124}Sn/^{120}Sn$ values of natural cassiterite crystals were analyzed to investigate the effect of particle size. FIG. 6 shows that the 2SD of $\delta^{124}Sn/^{120}Sn$ increased from 0.64‰ (initial cassiterite powder, without ultrafine processing) to 0.10‰(synthetic cassiterite, with ultrafine processing). Although the analysis of the initial cassiterite powder and the synthetic cassiterite gave consistent results, the accuracy of the synthetic cassiterite was greatly improved compared to the initial cassiterite powder, indicating that the Sn isotope homogeneity in the synthetic cassiterite is better.

Figure 7:
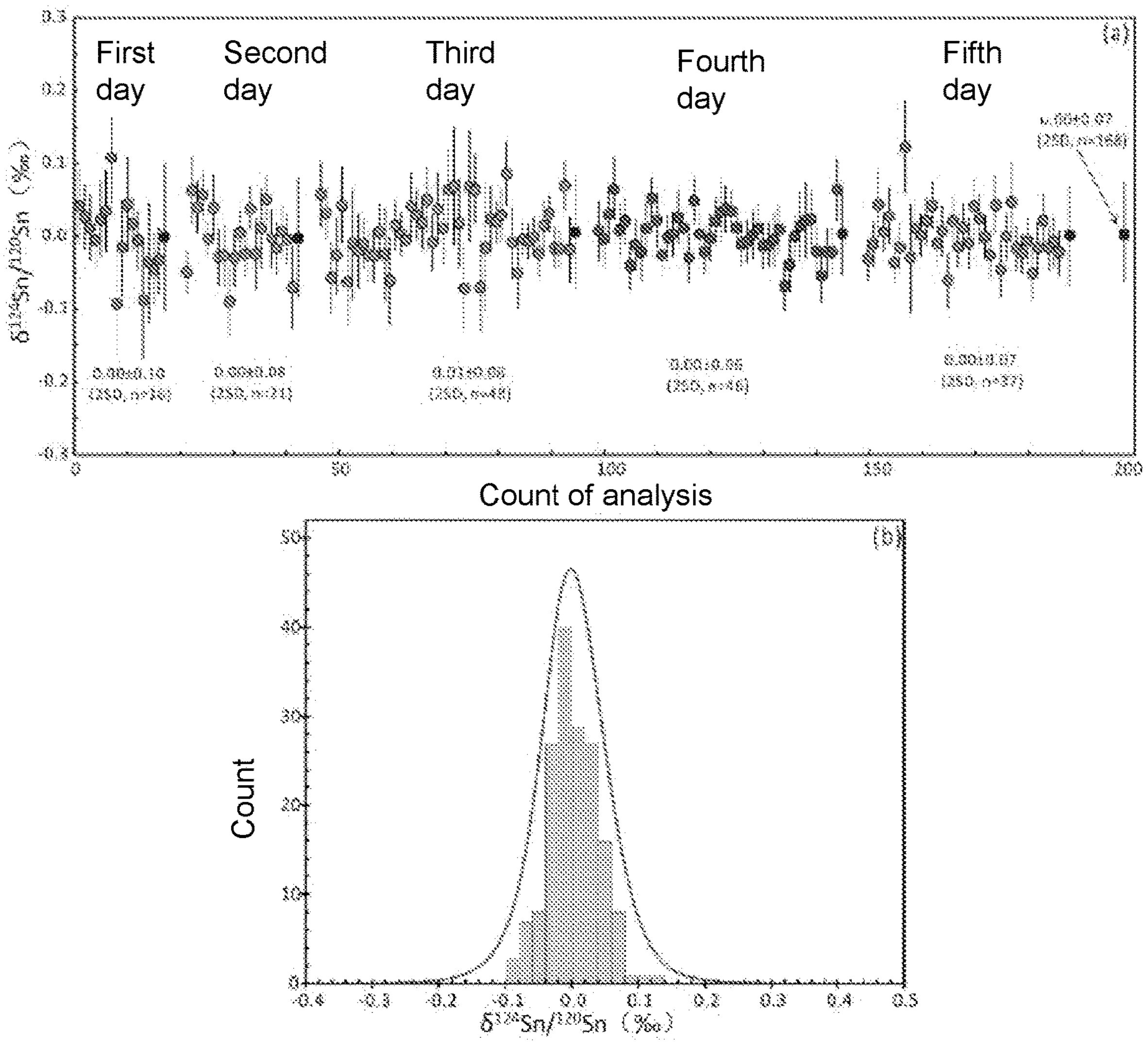
FIG. 7(*a*) is a graph illustrating $\delta^{124}Sn/^{120}Sn$ values of synthetic cassiterite prepared at a sintering temperature of 600° C. using fsLA-MC-ICP-MS for five different days, and FIG. 7(*b*) illustrates a frequency histogram and probability density curve of $\delta^{124}Sn/^{120}Sn$ values for five different days according to some embodiments of the present disclosure, where the circles in FIG. 7(*a*) represent the average values obtained for each day and the squares represent the average values obtained for five days.

As shown in FIG. 7(*a*), the average $\delta^{124}Sn/^{120}Sn$ values of synthetic cassiterite (prepared at 600° C. sintering temperature) measured at different five days were 0.00±0.10‰ (2SD, n=16), 0.00±0.08‰ (2SD, n=21), 0.01±0.08‰ (2SD, n=48), 0.00±0.06‰ (2SD, n=46) and 0.00±0.07‰ (2SD, n=37), proving that the average $\delta^{124}Sn/^{120}Sn$ values of synthetic cassiterite are more stable for the different five-day measurements. As shown in FIG. 7(*b*), all 168 $\delta^{124}Sn/^{120}Sn$ ratios measured over the five days followed a Gaussian distribution with an overall average value of 0.00±0.07‰ (2SD, n=168). Thus, a good external reproducibility of 0.07‰ was obtained for the repeated analysis of the synthetic cassiterite prepared at 600° C. sintering temperature, indicating that the uniform distribution of Sn isotopes meets the requirements of in-situ Sn isotope analysis by fsLA-MC-ICP-MS.

It can be seen from the above embodiments that synthetic cassiterite was obtained by reacting natural cassiterite at 600° C. and 1 GPa for 3 hours after the ultrafine processing. The signal intensity and signal distribution of the synthetic cassiterite are consistent with that of the natural cassiterite, indicating that the synthetic cassiterite is close to the theoretical maximum density. The tin isotope ratios of synthetic cassiterite measured by fsLA-MC-ICP-MS confirmed the homogeneity of $\delta^{124}Sn/^{120}Sn$ (2SD) at 0.10‰ analytical accuracy. The analytical reproducibility of synthetic cassiterite was improved from 0.64‰ to 0.10‰ (2SD, $\delta^{124}Sn/^{120}Sn$) compared to natural cassiterite. The average $\delta^{124}Sn/^{120}Sn$ ratio of 0.60±0.03‰ (2SD, n=5) determined by lots of SN-MC-ICP-MS measurements may be used as the recommended $\delta^{124}Sn/^{120}Sn$ value for synthetic cassiterite. The high-temperature sintering technique provides rapid solidification of ultrafine cassiterite powder and development of matrix-matched standard materials.

Example 6: In-Situ Microzone Analysis Using a Synthetic Cassiterite

In some embodiments, in-situ Sn isotope analysis of cassiterite for sample KB27 was performed at the State Key Laboratory of Continental Dynamics, Department of Geology, Northwest University (Xi'an), using a Neptune Plus™ MC-ICP-MS coupled to an NWR Femto UC Dualwave femtosecond laser ablation (ESI, USA). The femtosecond laser ablation system consisted of a Light Conversion Pharos HE laser, a laser transmission system, a gas flow control system, a sample station, a microscope system, and a software control system. The pharos laser is equipped with a fundamental near-infrared wavelength (1028 nm) and operated in ultraviolet wavelength 257 nm by the fourth-harmonic generation and wavelength 206 nm by the fifth-harmonic generation. During the Sn-isotope analysis, the KB27 sample was peeled by laser with a laser wavelength of 206 nm. The laser ablation was conducted under a He atmosphere in an ablation chamber, while Ar was mixed into the sample-out line downstream from the ablation chamber prior to entering the MC-ICP-MS. All microanalysis measurements were in a line-scan mode with a laser beam of 20 μm and lasted for 148 s, including a 30 s background measurement, 58 s data acquisition, and 60 s washout. Therefore, the lines used in the experiments were approximately 60 μm in length.

For in-situ Sn isotope analysis, L4, L2, L1, C, H1, H2, H3, and H4 cups were used to collect $^{116}Sn$, $^{119}Sn$, $^{120}Sn$, $^{121}Sb$, $^{122}Sn$, $^{123}Sb$, $^{124}Sn$, and $^{125}Te$, respectively. The $^{125}Te$ signal was measured to subtract the potential isobaric interference of $^{120}Te$ on $^{120}Sn$, $^{122}Te$ on $^{122}Sn$, and $^{124}Te$ on $^{124}Sn$. In such a case the interference of Te on Sn could be calculated using the natural abundance ratios of Te: $^{120}Te/^{125}Te$=0.01400, $^{122}Te/^{125}Te$=0.36415, $^{124}Te/^{125}Te$=0.67507. The SSB method was selected to correct the instrumental mass bias. All measurements were performed in medium mass resolution (~4000). Each in-situ Sn isotope measurement was performed in the time-resolved mode, acquiring 100 cycles of each 0.524 s. The washout time between two Sn isotope measurements was 60 s. The backgrounds obtained on $^{116}Sn$, $^{119}Sn$, $^{120}Sn$, $^{121}Sb$, $^{122}Sn$, $^{123}Sb$, $^{124}Sn$, and $^{125}Te$ were less than 0.1 mV, 0.5 mV, 3 mV, 2 mV, 1 mV, 2 mV, and 2 mV, respectively. During in-situ analysis of cassiterite, the signal intensity of $^{125}Te$ was less than 3 mV, and the calculated signal intensities of $^{120}Te$, $^{122}Te$, $^{124}Te$ were always less than 1 mV. Therefore, the interferences of Te do not influence the Sn isotope measurement. High-temperature sintered cassiterite (SN800, $\delta^{124}/^{116}Sn_{NIST3161a}$=1.25±0.09‰, Zhang et al., 2023) was used as the external standard for cassiterite. Finally, Sn isotope ratios were firstly expressed as a per mil deviation relative to the bracketing standard and then converted into values relative to the reference material NIST SRM 3161a: $\delta^{124}Sn_{NIST3161a}=[(^{124}Sn/^{116}Sn_{sample})/(^{124}Sn/^{116}Sn)_{cst\text{-}600}-1]\times1000+1.25$.

Figure 8:
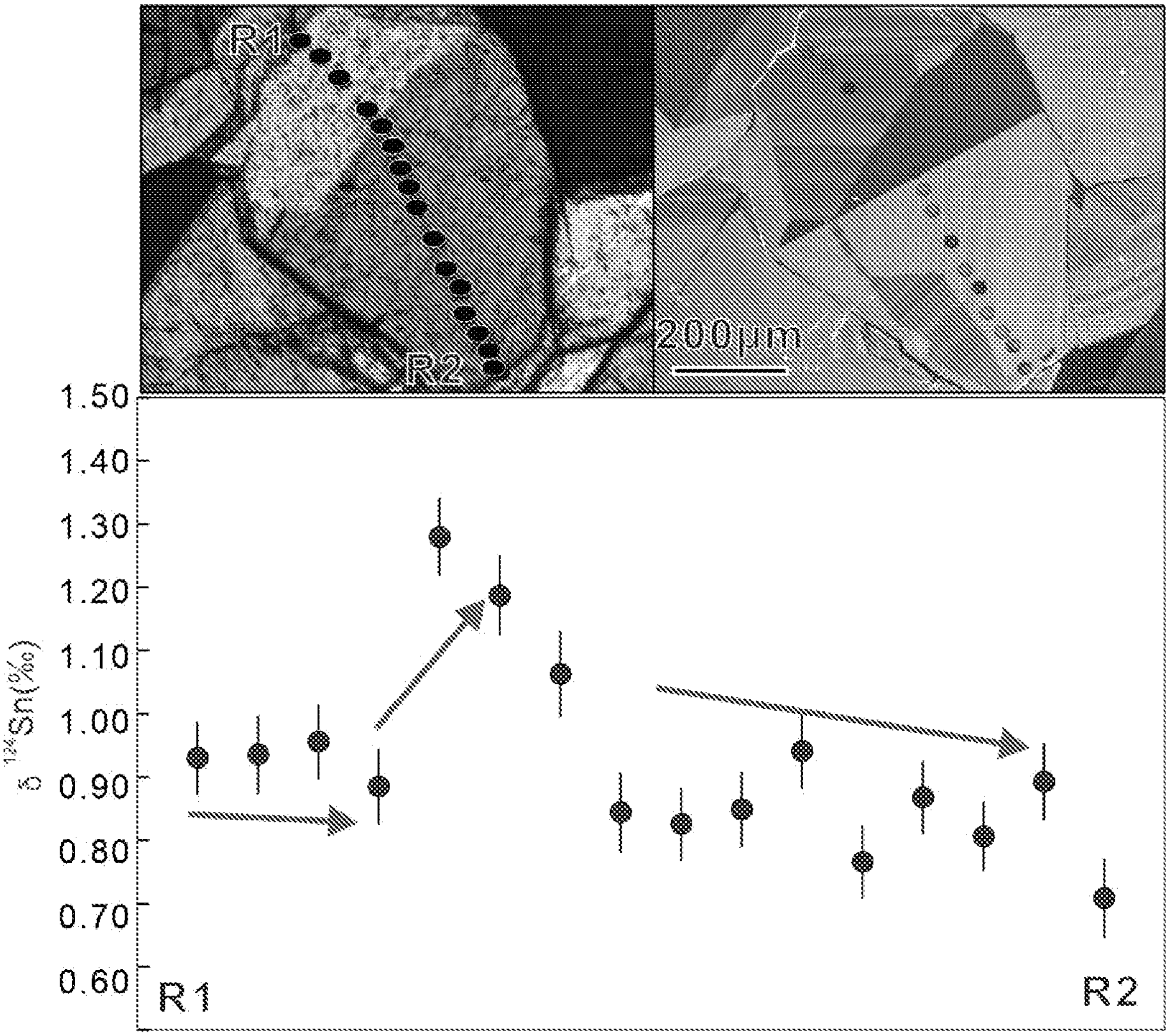
FIG. 8 illustrates the tin isotopic content in cassiterite (KB27 sample) determined by in-situ microregion analysis using synthetic cassiterite (SN800, $\delta^{124}$/116SnNIST3161 a=1.25±0.09‰) according to some embodiments of the present disclosure.

Experimental results: as shown in FIG. 8, cassiterite (sample KB27) has the heterogeneity of Sn isotope compositions with $\delta^{124}Sn$ values varying from +0.71 to +1.28‰.

Possible beneficial effects of embodiments of the present disclosure include, but are not limited to, the following: natural cassiterite is prepared through ultrafine process, followed by high temperature and high pressure conditions (e.g., 600° C.-1000° C., 1-2 GPa) to produce synthetic cassiterite, which has better homogeneity and can be used as a standard in in-situ microregion analysis techniques, thereby enabling accurate isotopic results for in-situ microregion analysis of cassiterite. It should be noted that different embodiments may produce different beneficial effects, and in different embodiments, the possible beneficial effects may be any one or a combination of the above, or any other beneficial effect that may be obtained.

When describing the operations performed by steps in the embodiments of the present disclosure, the order of the steps is interchangeable if not specifically stated, and the steps are omitted, and other steps may be included in the operation process.

The embodiments in the present disclosure are for example and illustration purposes only and do not limit the scope of application of the present disclosure. For those skilled in the art, various amendments and changes that can be made under the guidance of the present disclosure remain within the scope of the present disclosure.

Certain features, structures, or characteristics of one or more embodiments of the present disclosure may be suitably combined.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

In the event of any inconsistency or conflict between the descriptions, definitions, and/or use of terms in the materials referenced in the present disclosure and those described in the present disclosure, the descriptions, definitions, and/or use of terms in the present disclosure shall prevail.

What is claimed is:

1. A method for preparing a synthetic cassiterite, comprising:

grinding a natural cassiterite into ultrafine powder, wherein the ultrafine powder has a D90 in a range of 1-7 μm and a D50 in a range of 1-2 μm; and obtaining a synthetic cassiterite by sintering the ultrafine powder at a preset temperature and a preset pressure, the synthetic cassiterite being used as a standard substance for in-situ determination of tin isotope ratios.

2. The method of claim 1, wherein the grinding the natural cassiterite into ultrafine powder includes:

obtaining an initial cassiterite powder by performing a primary grinding of the natural cassiterite; and obtaining the ultrafine powder by performing a secondary grinding of the initial cassiterite powder.

3. The method of claim 2, wherein a duration of the secondary grinding is in a range of 10-15 h, wherein the secondary grinding is performed in alternating periods of grinding for 2-8 min and cooling for 0.5-3 min.

4. The method of claim 1, wherein the preset temperature is in a range of 600° C.-1000° C.

5. The method of claim 1, wherein the preset temperature is in a range of 700° C.-900° C.

6. The method of claim 1, wherein the preset pressure is in a range of 1-2 GPa.

7. The method of claim 1, wherein the preset pressure is 1 GPa.

8. The method of claim 1, wherein a duration for sintering the ultrafine powder at the preset temperature and the preset pressure is in a range of 2-5 h.

9. The method of claim 1, wherein the grinding the natural cassiterite into ultrafine powder includes:

obtaining the ultrafine powder by grinding the natural cassiterite using at least one of a ball mill or an agate mortar.

10. The method of claim 1, wherein the grinding the natural cassiterite into ultrafine powder includes:

grinding the natural cassiterite by at least one of wet grinding and dry grinding.

11. The method of claim 1, wherein the obtaining the synthetic cassiterite by sintering the ultrafine powder at the preset temperature and the preset pressure includes:

loading the ultrafine powder into a platinum tube and compacting the ultrafine powder, sealing the platinum tube by soldering;

heating the platinum tube containing the ultrafine powder for a preset time at the preset temperature and the preset pressure; and cooling the platinum tube containing the ultrafine powder to a room temperature at the preset pressure.

12. The method of claim 1, wherein the method further includes:

performing electron probe microanalysis and/or laser micro Raman analysis on the synthetic cassiterite and the natural cassiterite, wherein the synthetic cassiterite and the natural cassiterite have the same Raman spectrum, and the synthetic cassiterite has a uniform tin content.

13. The method of claim 1, wherein the method further includes:

performing a nanosecond laser ablation analysis on the synthetic cassiterite and the natural cassiterite, wherein the synthetic cassiterite and the natural cassiterite have the same signal intensity and signal distribution.

14. The method of claim 1, wherein the method further includes:

performing solution nebulizer multi-colletor inductively coupled plasma mass spectrometer (SN-MC-ICP-MS) analysis on the synthetic cassiterite and the ultrafine powder, wherein the synthetic cassiterite and the ultrafine powder have the same tin isotope ratio; and an average $\delta^{124}Sn/^{120}Sn$ determined by the SN-MC-ICP-MS analysis is 0.60±0.03‰ (2SD, n=5) and used as a recommended $\delta^{124}Sn/^{120}Sn$ for the synthetic cassiterite.

15. The method of claim 1, wherein the method further includes:

performing femtosecond laser ablation multi-colletor inductively coupled plasma mass spectrometer (fsLA-MC-ICP-MS) analysis on the synthetic cassiterite to obtain a precision of $\delta^{124}Sn/^{120}Sn$ of the synthetic cassiterite better than 0.1‰ (2SD).

16. The method of claim 1, wherein the method further includes:

performing a reproducible analysis on the synthetic cassiterite, the synthetic cassiterite having an analytical reproducibility of $\delta^{124}Sn/^{120}Sn$ less than 0.1‰ (2SD).

17. A synthetic cassiterite, wherein the synthetic cassiterite is prepared by the preparation method of claim 1.

18. A method for in-situ microregion analysis using the synthetic cassiterite of claim 17, the method comprising:

performing laser ablation on a sample to be measured and a standard substance, wherein the standard substance is the synthetic cassiterite;

detecting tin isotope ratios of the ablated sample to be measured and the ablated standard substance; and determining a tin isotope content of the sample to be measured based on the tin isotope ratios of the ablated sample to be measured and the ablated standard substance and a tin isotope ratio of the standard substance relative to a reference substance.

19. The method of claim 18, wherein the tin isotopic ratio of the standard substance relative to the reference substance is determined by bulk solution analysis.

* * * * *